United States Patent
Chavez Vazquez

(10) Patent No.: US 12,473,038 B2
(45) Date of Patent: Nov. 18, 2025

(54) RETROFITTED VEHICLE WITH IMPROVED PASSENGER EXPERIENCE

(71) Applicant: Victor Manuel Chavez Vazquez, San Antonio, TX (US)

(72) Inventor: Victor Manuel Chavez Vazquez, San Antonio, TX (US)

( * ) Notice: Subject to any disclaimer, the term of this patent is extended or adjusted under 35 U.S.C. 154(b) by 0 days.

(21) Appl. No.: 19/219,614

(22) Filed: May 27, 2025

(65) Prior Publication Data

US 2025/0282430 A1 Sep. 11, 2025

Related U.S. Application Data

(63) Continuation of application No. 18/939,400, filed on Nov. 6, 2024, now Pat. No. 12,312,016, which is a (Continued)

(51) Int. Cl.
*B62D 25/20* (2006.01)
*B60N 2/01* (2006.01)
(Continued)

(52) U.S. Cl.
CPC ............... *B62D 33/04* (2013.01); *B60N 2/01* (2013.01); *B60N 3/063* (2013.01); *B60R 3/02* (2013.01);
(Continued)

(58) Field of Classification Search
CPC ............... B62D 25/20; B62D 25/2082; B62D 25/2054; B62D 31/02; B62D 31/025;
(Continued)

(56) References Cited

U.S. PATENT DOCUMENTS 1,130,026 A * 3/1915 Senter ................... B62D 31/02
D12/84
1,356,558 A 10/1920 Purcell
(Continued)

FOREIGN PATENT DOCUMENTS

CA 2595197 A1 1/2009
CN 101992810 A 3/2011
(Continued)

OTHER PUBLICATIONS

"Kemimoto Windshield", printed from the internet Jul. 9, 2024, first posted to the internet Apr. 1, 2020, Amazon.com.
(Continued)

*Primary Examiner* — Gregory A Blankenship
(74) *Attorney, Agent, or Firm* — Outlier Patent Attorneys, PLLC

(57) ABSTRACT

A retrofitted bus featuring a progressive floor elevation system that gradually increases the height of modular flooring sections from front to rear, creating additional underfloor storage space and improving passenger visibility. The bus incorporates elevated passenger seating assemblies with rigid support structures and adjustable footrests for enhanced comfort and accessibility. The retrofitted stowage space may include insulation, climate control, and video monitoring systems. An engine safety cover, constructed from fire-resistant, thermally insulating, and structurally reinforced materials, integrates an extinguishing system for fire suppression. A swing-down egress mechanism at the rear of the bus serves as a structural component during normal operation and converts to an evacuation slide or stairs during emergencies.

8 Claims, 9 Drawing Sheets

Related U.S. Application Data continuation-in-part of application No. 18/219,653, filed on Jul. 8, 2023, now abandoned.

(60) Provisional application No. 63/547,537, filed on Nov. 6, 2023, provisional application No. 63/436,121, filed on Dec. 30, 2022.

(51) Int. Cl.

| | |
|---|---|
| *B60N 3/06* | (2006.01) |
| *B60R 3/02* | (2006.01) |
| *B62D 25/06* | (2006.01) |
| *B62D 29/00* | (2006.01) |
| *B62D 31/02* | (2006.01) |
| *B62D 31/04* | (2006.01) |
| *B62D 33/04* | (2006.01) |
| *B62D 47/02* | (2006.01) |
| *A62C 3/07* | (2006.01) |
| *B60N 2/24* | (2006.01) |
| *B60R 25/30* | (2013.01) |

(52) U.S. Cl.
CPC ......... *B62D 25/06* (2013.01); *B62D 25/2054* (2013.01); *B62D 29/00* (2013.01); *B62D 31/025* (2013.01); *B62D 31/04* (2013.01); *A62C 3/07* (2013.01); *B60N 2/242* (2013.01); *B60R 25/305* (2013.01); *B60Y 2200/143* (2013.01); *B62D 47/02* (2013.01)

(58) Field of Classification Search
CPC .......... B62D 31/04; B62D 47/02; B60N 2/01; B60N 2/0292; B60R 5/003; B60R 5/043; B60Y 2200/143
See application file for complete search history.

(56) References Cited

U.S. PATENT DOCUMENTS

| | | | |
|---|---|---|---|
| 1,715,928 A | 6/1929 | Kashian | |
| 1,727,721 A | 9/1929 | Langlands et al. | |
| 1,760,422 A | 5/1930 | Mackie | |
| 3,777,648 A | 12/1973 | McGowan et al. | |
| 3,926,100 A | 12/1975 | Bermanseder et al. | |
| 4,964,671 A * | 10/1990 | Millar | B60P 3/0252 296/64 |
| 5,066,067 A | 11/1991 | Ferdows | |
| 5,183,308 A | 2/1993 | Koga et al. | |
| 6,106,044 A | 8/2000 | Schlachter | |
| 6,793,265 B2 | 9/2004 | Kamida et al. | |
| 7,841,640 B2 | 11/2010 | Bowen | |
| 8,083,280 B2 | 12/2011 | Muglia et al. | |
| 8,284,327 B2 | 10/2012 | Counts | |
| 10,639,972 B1 | 5/2020 | Lillo | |
| 10,749,146 B2 | 8/2020 | Berger et al. | |
| 10,857,947 B2 | 12/2020 | Kovach et al. | |
| 10,926,708 B2 | 2/2021 | Gill et al. | |
| 10,947,760 B2 | 3/2021 | Kim et al. | |
| 11,225,172 B2 | 1/2022 | Mozurkewich et al. | |
| 11,590,913 B2 | 2/2023 | Tippy et al. | |
| 11,772,519 B2 | 10/2023 | Kondrad et al. | |
| 12,286,167 B1 * | 4/2025 | Delforte | B60P 1/433 |
| 12,312,016 B2 * | 5/2025 | Chavez Vazquez | B62D 31/04 |
| 2007/0216186 A1 | 9/2007 | Sumida et al. | |
| 2008/0164712 A1 * | 7/2008 | Burkey | B60R 7/043 296/65.09 |
| 2008/0309112 A1 | 12/2008 | Duller | |
| 2009/0218839 A1 * | 9/2009 | Muglia | B60R 9/02 24/304 |
| 2010/0109387 A1 | 5/2010 | Merensky | |
| 2011/0068566 A1 * | 3/2011 | Bartel | B62D 31/02 280/788 |
| 2011/0298189 A1 | 12/2011 | Schneider et al. | |
| 2016/0075388 A1 * | 3/2016 | D'Urso | B62D 31/04 29/401.1 |
| 2017/0174267 A1 | 6/2017 | Saur et al. | |
| 2022/0340085 A1 | 10/2022 | Li | |
| 2023/0358084 A1 | 11/2023 | Purcell | |
| 2024/0217395 A1 * | 7/2024 | Chavez Vazquez | B60N 2/01 |
| 2024/0239494 A1 | 7/2024 | Rheaume | |
| 2025/0058836 A1 * | 2/2025 | Chavez Vazquez | B62D 33/04 |
| 2025/0196725 A1 * | 6/2025 | Miyoshi | B60J 7/043 |

FOREIGN PATENT DOCUMENTS

| | | |
|---|---|---|
| CN | 211798449 U | 10/2020 |
| DE | 2814282 C2 | 12/1988 |
| GB | 2411154 B | 8/2005 |
| JP | 3577437 B2 | 10/2004 |
| WO | 2013144935 A2 | 10/2013 |
| WO | 2024145696 A1 | 7/2024 |

OTHER PUBLICATIONS

International Search Report and Written Opinion by ISA/US of PCT/US2024/054792, dated Feb. 11, 2025.
International Search Report and Written Opinion by ISA/US of PCT/US24/13208, dated Apr. 11, 2024.

* cited by examiner

RETROFITTED VEHICLE WITH IMPROVED PASSENGER EXPERIENCE

CROSS-REFERENCE TO RELATED APPLICATIONS

This application is a continuation of U.S. Non-Provisional application Ser. No. 18/939,400 filed on Nov. 6, 2024, titled "RETROFITTED BUS WITH IMPROVED PASSENGER EXPERIENCE," which is a continuation-in-part of U.S. Non-Provisional application Ser. No. 18/219,653 filed on Jul. 8, 2023 titled "ELEVATED PASSENGER SEATS FOR VEHICLES." It also claims the benefit of, and priority to, U.S. Provisional Patent Application No. 63/436,121 titled "ELEVATED PASSENGER SEATS FOR VEHICLES" filed on Dec. 30, 2022, and U.S. Provisional Patent Application No. 63/547,537 filed on Nov. 6, 2023, titled "ELEVATED PASSENGER SEATS FOR BUSES."

These applications are incorporated by reference in their entirety herein.

BACKGROUND

Field of Art

The present disclosure is related to the field of vehicle design and modification, specifically pertaining to passenger buses.

Discussion of the State of the Art

Buses have been a primary mode of public transportation for decades, offering an affordable and efficient means of travel for millions of people worldwide. However, despite their widespread use, buses have seen limited innovation in recent years, resulting in poor mass-market adoption and a suboptimal user experience. This lack of innovation has led to several problems, including outdated safety features, limited passenger comfort, and inefficient use of space.

Various attempts have been made to address these issues and improve the overall bus experience. One such attempt is the introduction of double-decker buses, which aim to increase passenger capacity and provide a unique travel experience. While double-decker buses have found success in certain markets, they come with their own set of limitations. These buses often face height restrictions, making them unsuitable for many routes with low-clearance obstacles such as bridges or tunnels. Additionally, the adoption of double-decker buses requires the buildup of entirely new fleets, leading to the obsolescence of existing single-deck buses and significant capital investments for transportation authorities.

Another approach to enhancing the bus experience has been the development of luxury coaches. These coaches offer premium amenities, such as comfortable seating, entertainment systems, and Wi-Fi connectivity, to attract more passengers and improve user satisfaction. However, luxury coaches primarily cater to a niche market and fail to address the fundamental issues faced by the majority of bus passengers. Moreover, they do not prioritize the improvement of safety features, which is a critical concern for many travelers.

SUMMARY

The present invention is a retrofitted bus designed to improve passenger safety, comfort, and overall user experience. The invention provides a solution to enhance existing bus fleets without requiring the complete replacement of vehicles. The retrofitted bus incorporates several features, including, but not limited to progressive floor elevation system, which improves visibility for all passengers, contributing to a safer and more comfortable travel experience; elevated passenger seating assemblies, which further enhance visibility and provide a secure and comfortable seating arrangement; a retrofitted stowage space, which optimizes the use of available space, allowing for secure and convenient storage of passenger belongings; an engine safety cover, which provides an additional layer of protection, reducing the risk of injury in the event of an accident; a swing down egress mechanism, which offers a quick and efficient means of emergency evacuation, ensuring rapid and safe passenger exit in critical situations; and a roof mounted air safety system, which enhances the bus's stability and reduces the risk of rollover accidents, providing a safer travel environment.

Compared to prior art solutions, such as double-decker buses and luxury coaches, the retrofitted bus offers a comprehensive approach to improving the bus experience. By focusing on retrofitting existing buses, the invention eliminates the need for significant capital investments in new fleets and allows for the gradual improvement of bus services.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

Figure 5A:
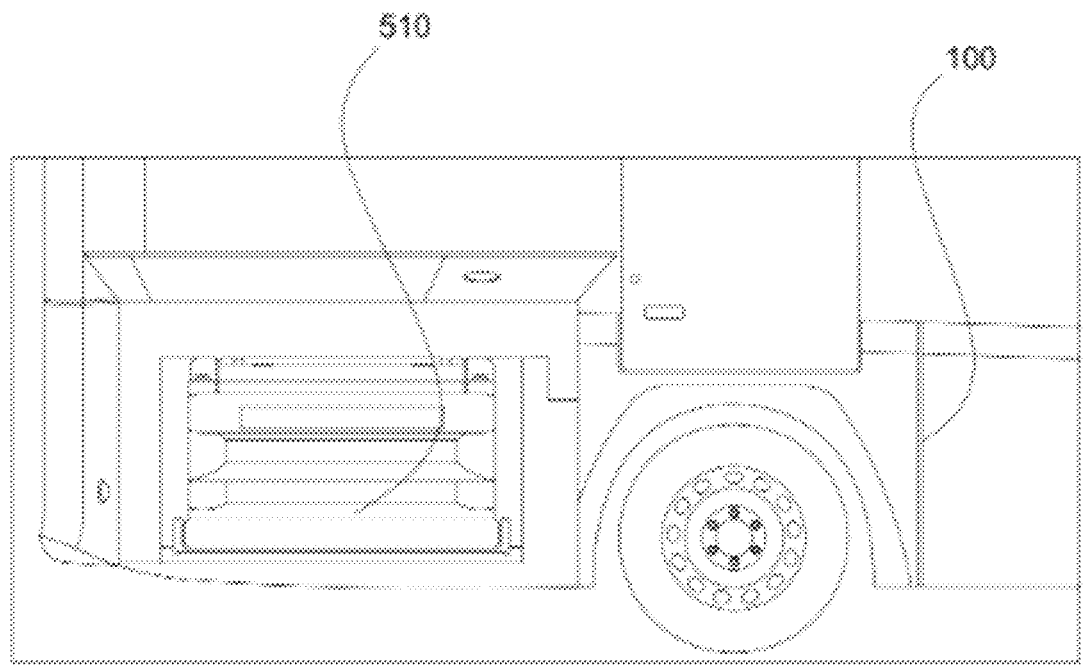
FIG. 5A illustrates an exemplary engine cover in accordance with an embodiment of the invention.
Figure 5B:
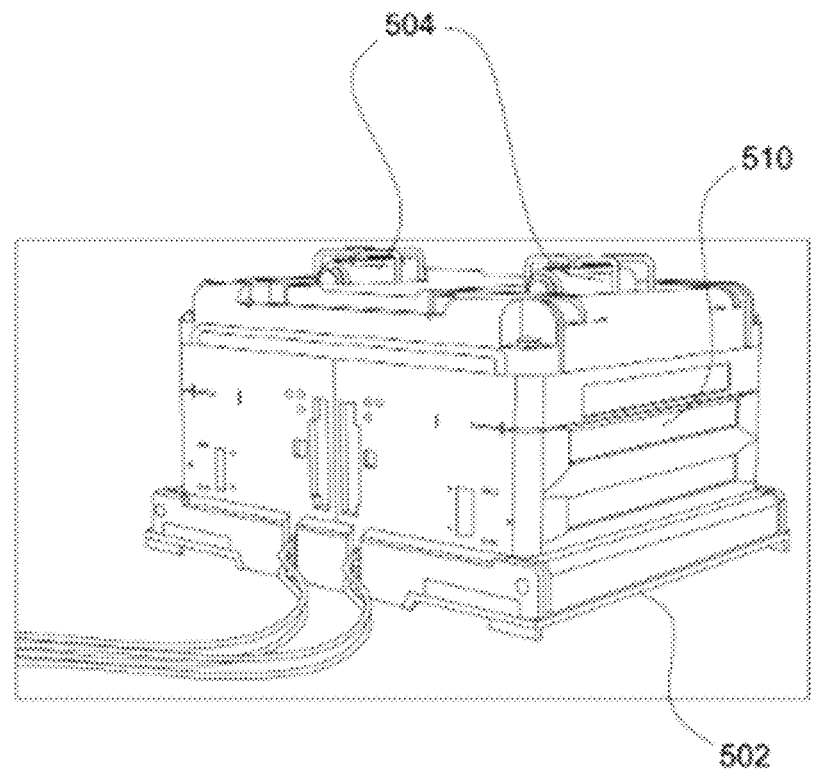

FIG. 5B also illustrates an exemplary engine cover in accordance with an embodiment of the invention.

Figure 6:
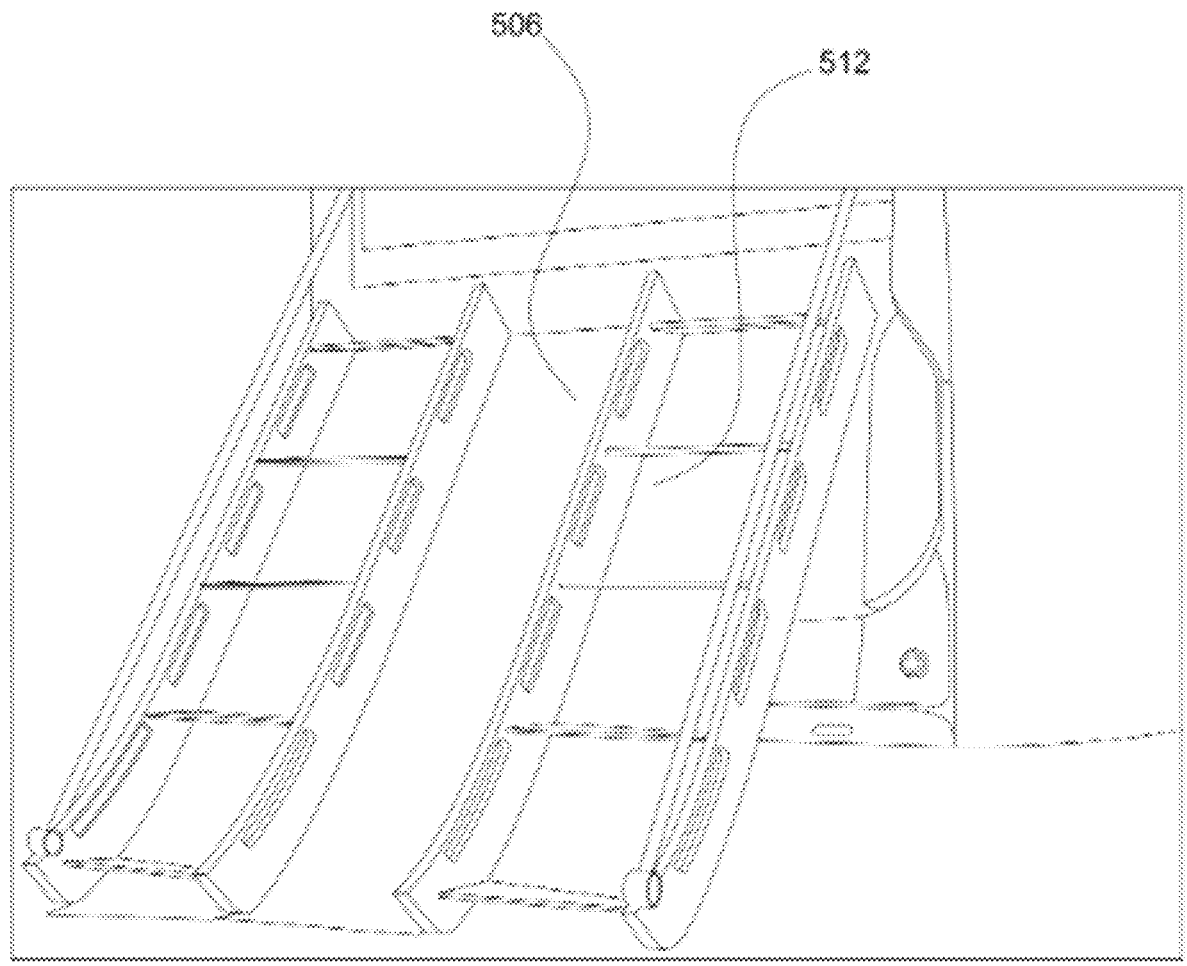

FIG. 6 illustrates a swing down egress mechanism in accordance with an embodiment of the invention.

Figure 7:
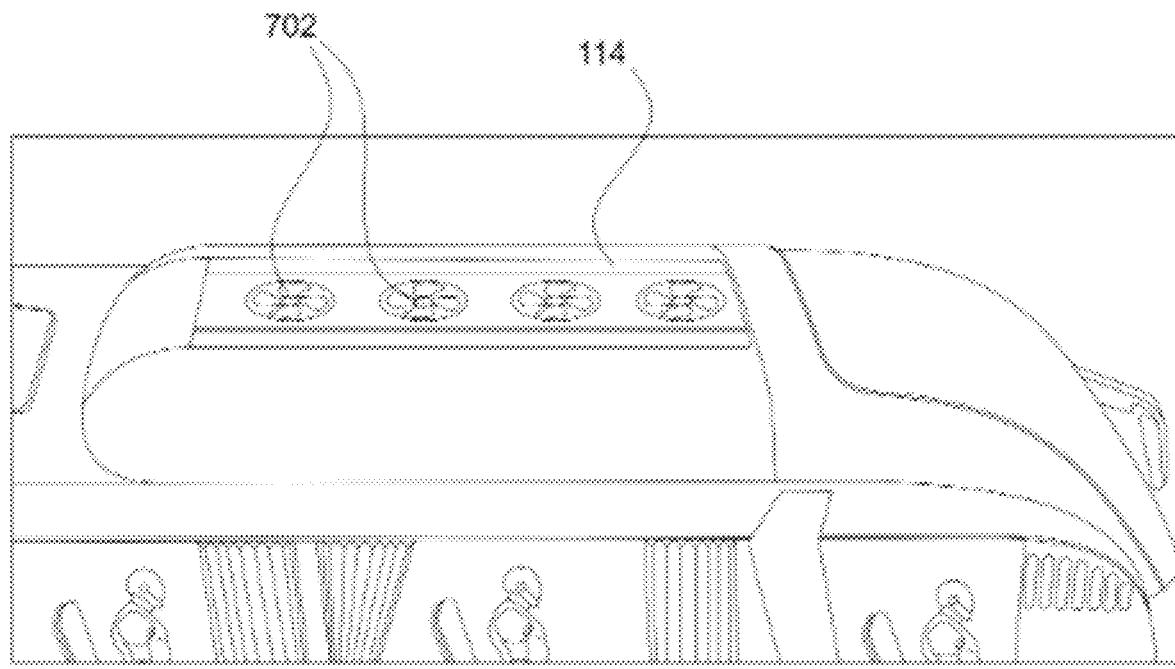

FIG. 7 illustrates a roof mounted air safety system in accordance with an embodiment of the invention.

Figure 8A:
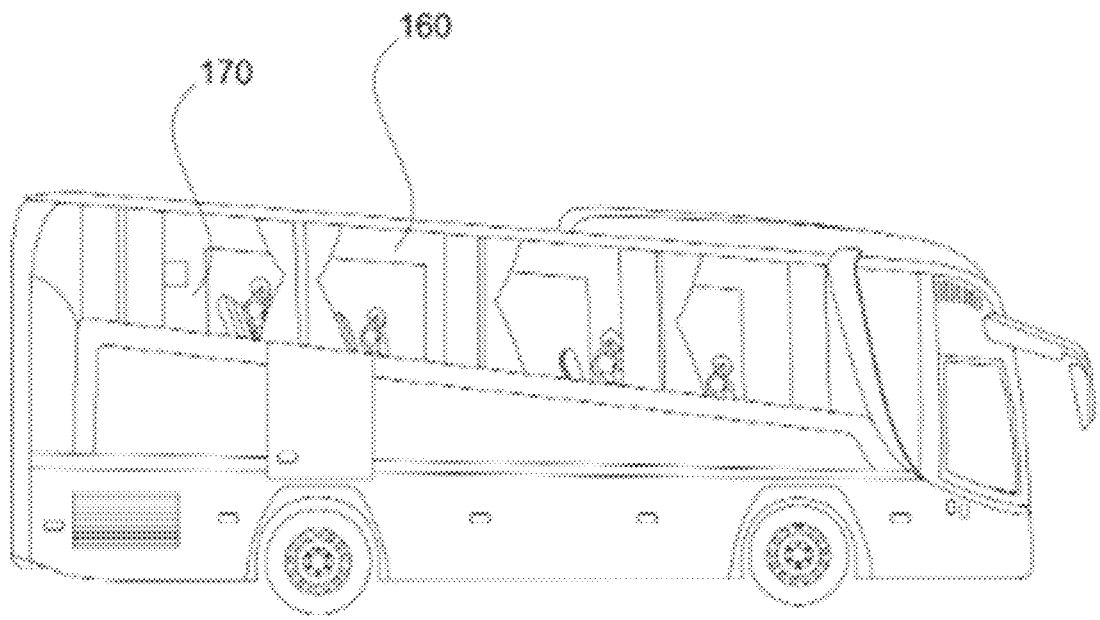

FIG. 8A illustrates a manufactured bus in accordance with an embodiment of the invention.

Figure 8B:
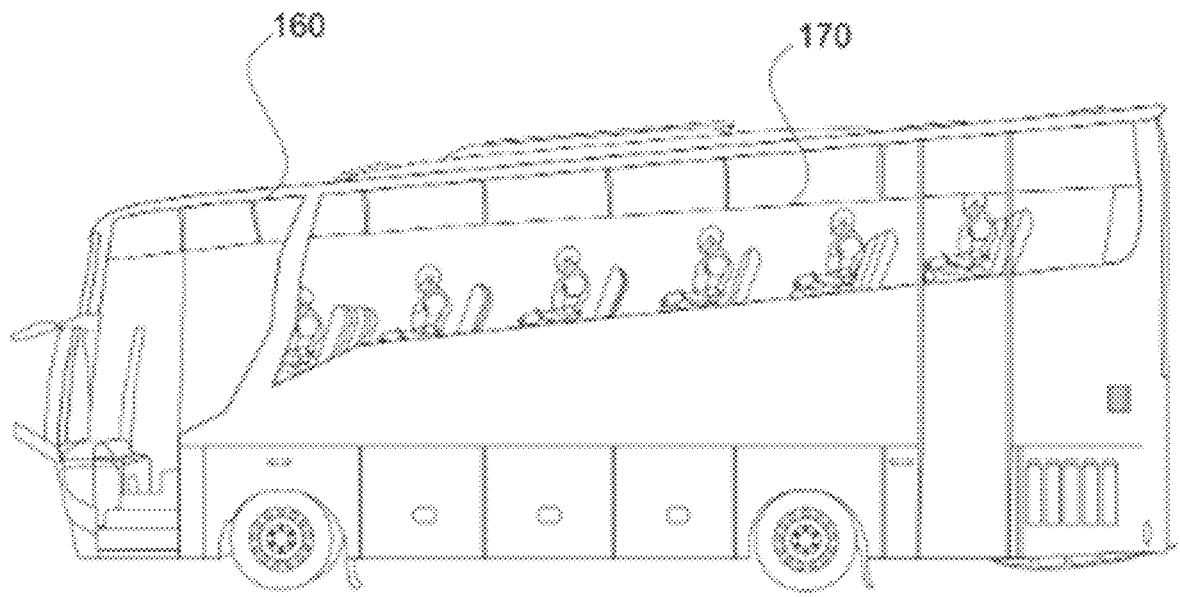

FIG. 8B illustrates a manufactured bus in accordance with an embodiment of the invention.

DETAILED DESCRIPTION OF EMBODIMENTS

The invention is described by reference to various elements herein. It should be noted, however, that although the various elements of the inventive apparatus are described separately below, the elements need not necessarily be separate. The various embodiments may be interconnected and may be cut out of a singular block or mold. The variety of different ways of forming an inventive apparatus, in accordance with the disclosure herein, may be varied without departing from the scope of the invention.

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices and parts that are connected to each other need not be in continuous connection with each other, unless expressly specified otherwise. In addition, devices and parts that are connected with each other may be connected directly or indirectly through one or more connection means or intermediaries.

A description of an aspect with several components in connection with each other does not imply that all such components are required. To the contrary, a variety of optional components may be described to illustrate a wide variety of possible embodiments and in order to more fully illustrate one or more embodiments. Similarly, although process steps, method steps, or the like may be described in a sequential order, such processes and methods may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, or method is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Alternate implementations are included within the scope of various embodiments in which, for example, functions may be executed out of order from that shown or discussed, including substantially concurrently or in reverse order, depending on the functionality involved, as would be understood by those having ordinary skill in the art.

Apparatus

The apparatus of the present invention is comprised of the retrofitted elements illustrated in FIGS. 1-8. The retrofitted elements are applied to a passenger-vehicle body originally manufactured with: a floor pan, a front-row seat assembly fixed to the floor pan, and factory rear-seat anchor points located behind the front-row seat assembly. The retrofitted elements enhance passenger safety, comfort, and user experience through various innovative features, including, but not limited to progressive floor elevation system 104, elevated passenger seat assembly 106, retrofitted stowage space 108, engine safety cover 110, swing down egress mechanism 112, and/or roof mounted air safety module 114. The disclosed invention addresses the shortcomings of existing bus designs by optimizing space utilization, improving visibility, and prioritizing passenger safety. Importantly, the invention is designed to be retrofitted onto existing buses, allowing for the gradual improvement of bus services without requiring significant investments in new fleets. The retrofitting process involves the installation of one or more retrofitted elements onto existing bus structures.

The progressive floor elevation system 104 (illustrated as 104a, 104b, 104c, 104d and 104e) is comprised of flooring sections that gradually increase in height from the front of the vehicle to the rear. The progressive elevation creates additional storage compartments underneath each elevated section, effectively optimizing the use of available space within the bus. Moreover, the progressive floor elevation system 104 improves visibility for all passengers, ensuring a more enjoyable and safer travel experience. The retrofitting of this system involves the installation of the elevated flooring sections onto the existing bus floor, with minimal modifications to the bus's structural integrity. The various floor elevation components 104a, 104b, 104c, 104d, and 104e are herein collectively or invariably referred to as 104. The various floor elevation components 104a, 104b, 104c, 104d, and 104e are herein collectively or individually referred to as 104.

The elevated passenger seating assemblies 106 (illustrated as 106a, 106b, 106c, and 106d in FIG. 1) enhance visibility and provide a comfortable and secure seating arrangement for passengers. Each assembly includes a rigid support structure 110 that extends across the width of one or more seats.

Figure 2A:
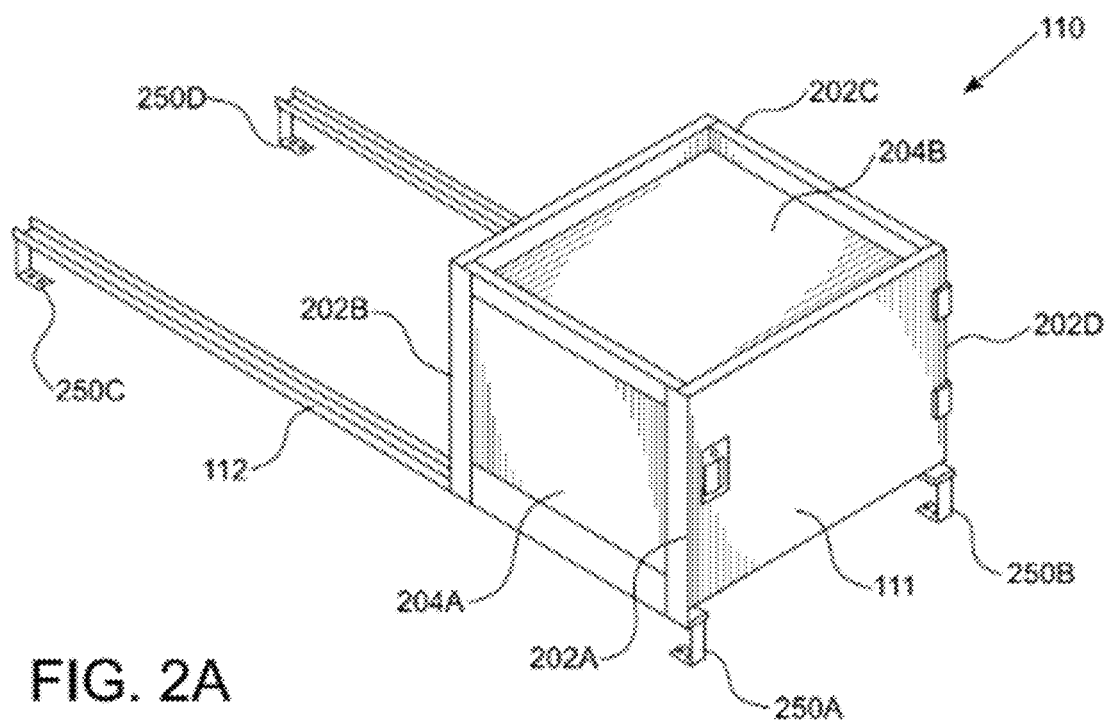
FIG. 2A illustrates an exemplary stowage compartment in a closed configuration in accordance with an embodiment of the invention.
Figure 2B:
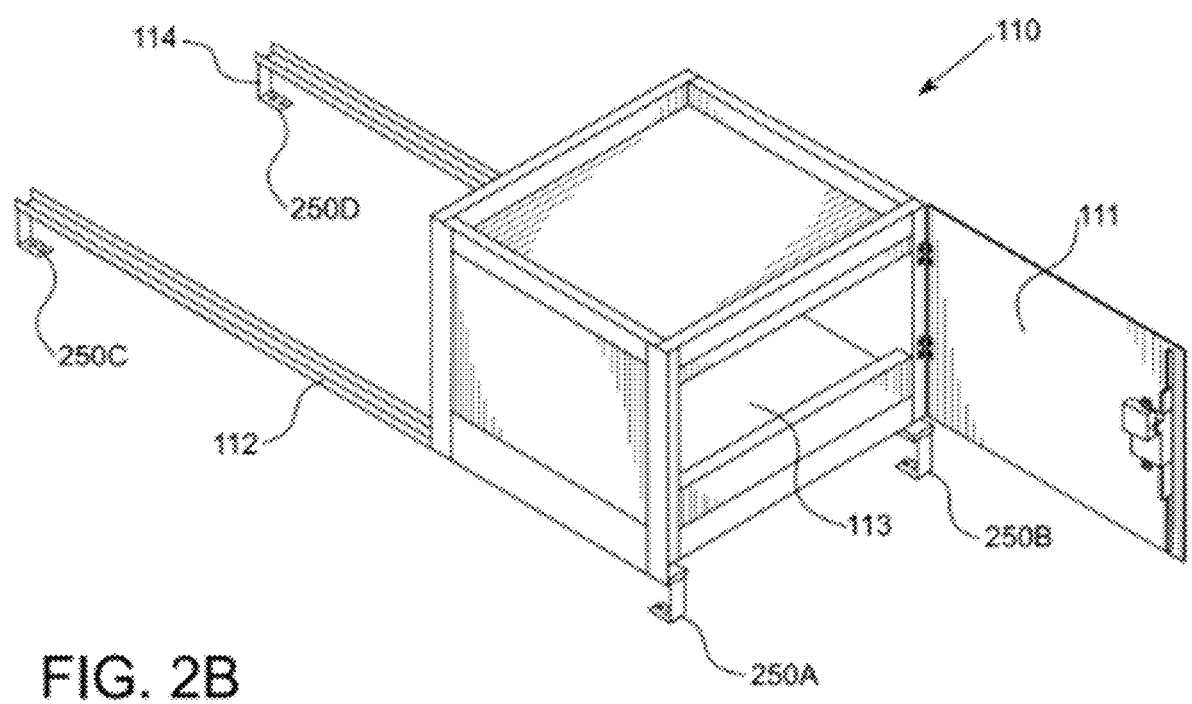
FIG. 2B illustrates an exemplary stowage compartment in an open configuration in accordance with an embodiment of the invention.

FIGS. 2A and 2B illustrate an exemplary rigid support structure 110. The rigid support structure 110 creates or encloses at least one stowage space 113. In one embodiment, the stowage may be accessed by an access port 111. The access port 111 may be a door that opens from a hinge, slides like a shutter or a garage, or may open and close via any mechanism that would be used or known by a person of ordinary skill in the art without departing from the scope of the invention. In one embodiment, the rigid support structure 110 is formed by support members 202A, 202B, 202C, and/or 202D as well as closure elements 204A and/or optionally 204B that may extend between the various support members 202A, 202B, 202C, and/or 202D. The rigid support structure 110 may be fastened directly to the factory rear-seat anchor points, the rigid support structure 110 may have a height in a range of 10 cm to 60 cm. As described herein and illustrated in various figures, the rigid support structure 110 may be placed below a seat 130 and/or 140. Additionally, it may be placed over the floorboards of a vehicle to help raise the seat height 130 and/or 140. There may be a plurality of walls extending between the rigid support structure and the floor pan that together bound an enclosed stowage compartment located entirely beneath the passenger seat assembly.

FIGS. 2A and 2B also illustrate a sliding mechanism 112. The sliding mechanism 112 enables the rigid support structure 110 to move across the sliding mechanism structure. In one embodiment, the sliding mechanism 112 may be laid out in one orientation extending from aisle to window. The rigid support structure 110 along with seats 130 and/or 140 placed or attached to their associated support structures 110 may be moved to enable a passenger to move to a row of seating behind the seats that are being moved. The sliding mechanism 112 is illustrated as rails in FIGS. 2A and 2B, but a variety of mechanisms may be used to slide or move the seats 130 and/or 140 as would be understood by a person of ordinary skill in the art. Those other mechanisms may be used without departing from the scope of the invention.

Figure 2C:
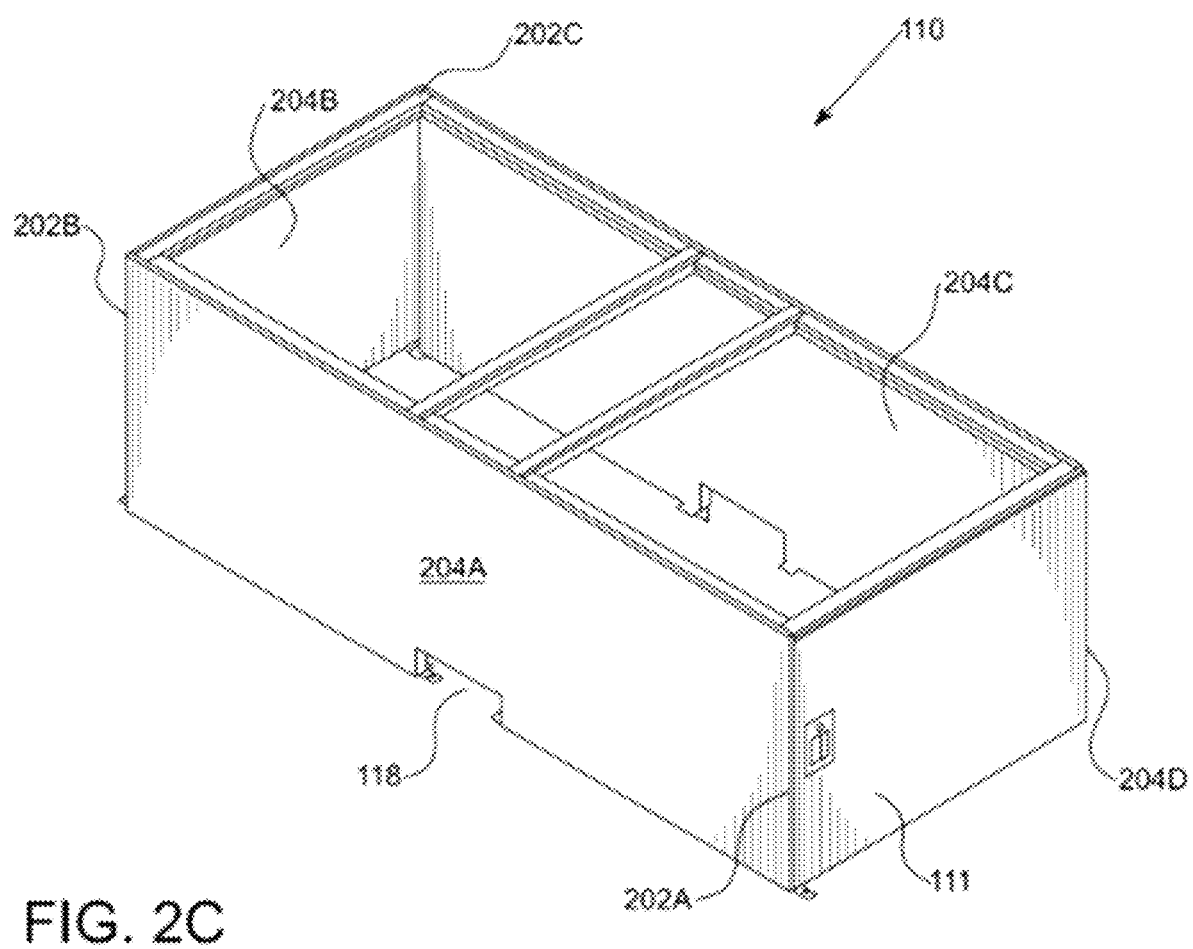
FIG. 2C illustrates an exemplary stowage compartment in accordance with an embodiment of the invention.

FIG. 2C illustrates the rigid support structure 110 in accordance with another embodiment of the invention. In this embodiment, the rigid support structure extends the entire width of a vehicle. It includes rigid support members 202A, 202B, 202C, and/or 202D. Other support members may be used without departing from the scope of the invention. The rigid support structure 110 may also include closure elements 204A and/or optionally 204B and/or 204C that may extend between the various support members 202A, 202B, 202C, and/or 202D. The rigid support structure 110 may also include an access port 111. The access port 111 may be a door that opens from a hinge, slides like a shutter or a garage, or may open and close via any mechanism that would be used or known by a person of ordinary skill in the art without departing from the scope of the invention. In one embodiment, the rigid support structure 110 may also include accommodation 118 to accommodate transmission components that may run vertically in a car. The accommodation 118 may not be needed in electric cars that do not have a transmission hump running through the floorboards. The rigid support structure may span substantially an entire width of the vehicle interior between opposed door sills.

In one embodiment, the rigid support structure 110 may be bolted on to the frame of the vehicle chassis. This may enable a floating structure, which is within the scope of the present invention.

In one embodiment, the rigid support structure 110 is designed to be securely fastened at the bottom to the frame of the vehicle using, for example, bolts or by being welded to the vehicle frame. In one embodiment, the rails 112 that support the rigid support structure 110 may be bolted onto the floors via coupling systems 250A, 250B, 250C and/or 250D as illustrated in FIGS. 2A and 2B. Other mechanisms for securing the rigid support structure 110 to the vehicle, which are known to persons of ordinary skill in the art, may be used without departing from the scope of the invention.

In one embodiment, the rigid frame structure 110 supports a passenger seat assembly that would be fastened to the top of the rigid frame structure 110 using, for example, bolts or by being welded. The rigid frame structure 110 and associated seat assembly would be designed to pass crash-worthiness tests when properly attached to the frame of the vehicle and when passengers are securely fastened using approved seat belts. The height of the rigid frame structure 110 would be predetermined to provide an appropriate elevated seat, based on different parameters such as vehicle model specific dimensions, number of rear seat rows, height of the vehicle roof, etc.

Figure 3:
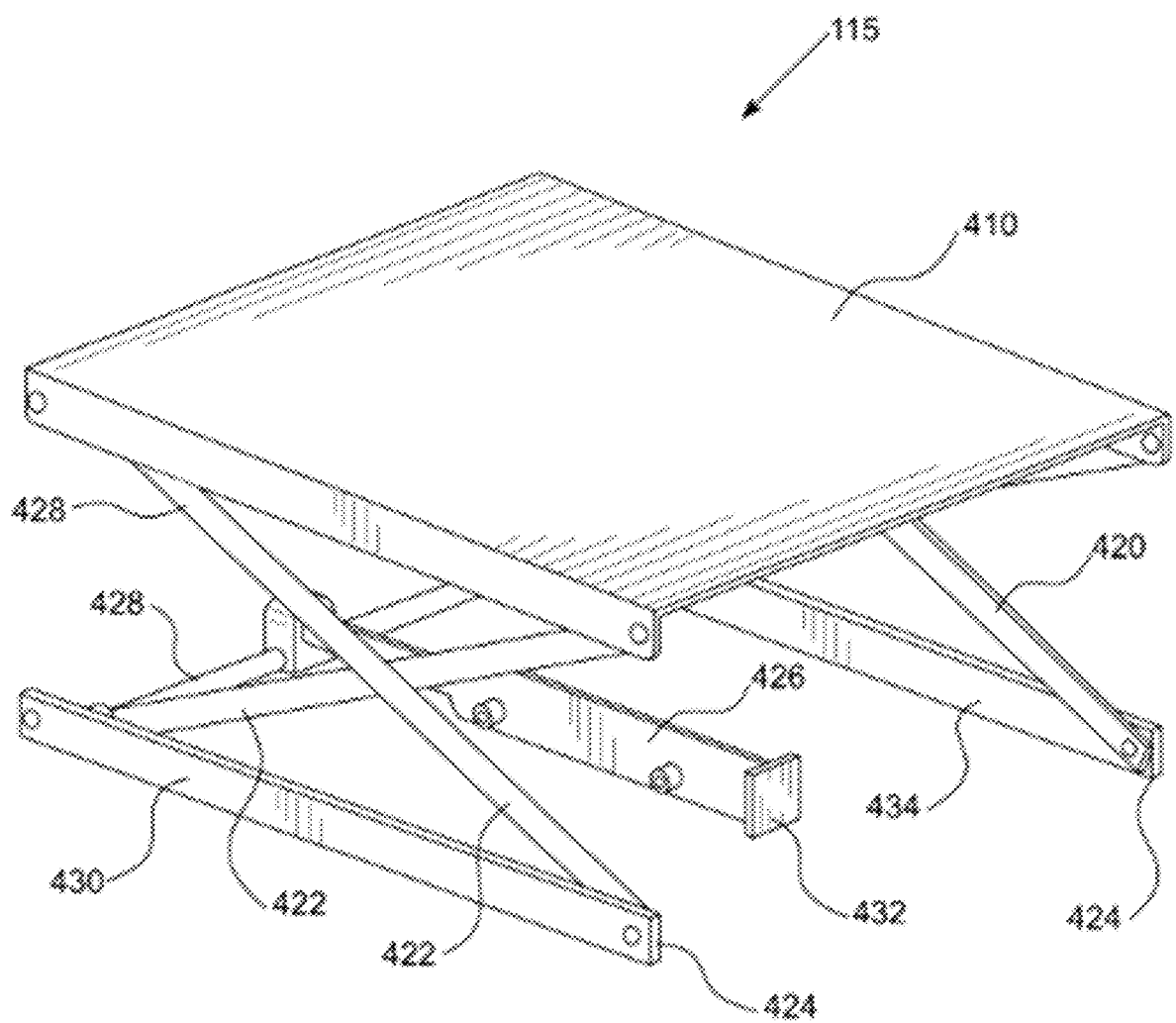
FIG. 3 illustrates an exemplary embodiment of adjustable footrests in accordance with an embodiment of the invention.

In one embodiment, the elevated passenger seating assembly 106 is further comprised of adjustable footrests 115A and/or 115B, as illustrated in FIG. 3. Footrests 115*a* and/or 115*b* increase comfort and improve ergonomics while being seated in an elevated seat. In some embodiments each elevated passenger seating assembly 106 is provided with adjustable footrest(s) 115A and/or 115B, thereby providing each passenger with an adjustable footrest. These adjustable footrests 115, when in their lowermost position, permit passengers to climb into their elevated seat 130 and/or 140. Once situated in the seat, the passenger can then adjust the height of the footrest 115 to their personal preference.

Figure 4:
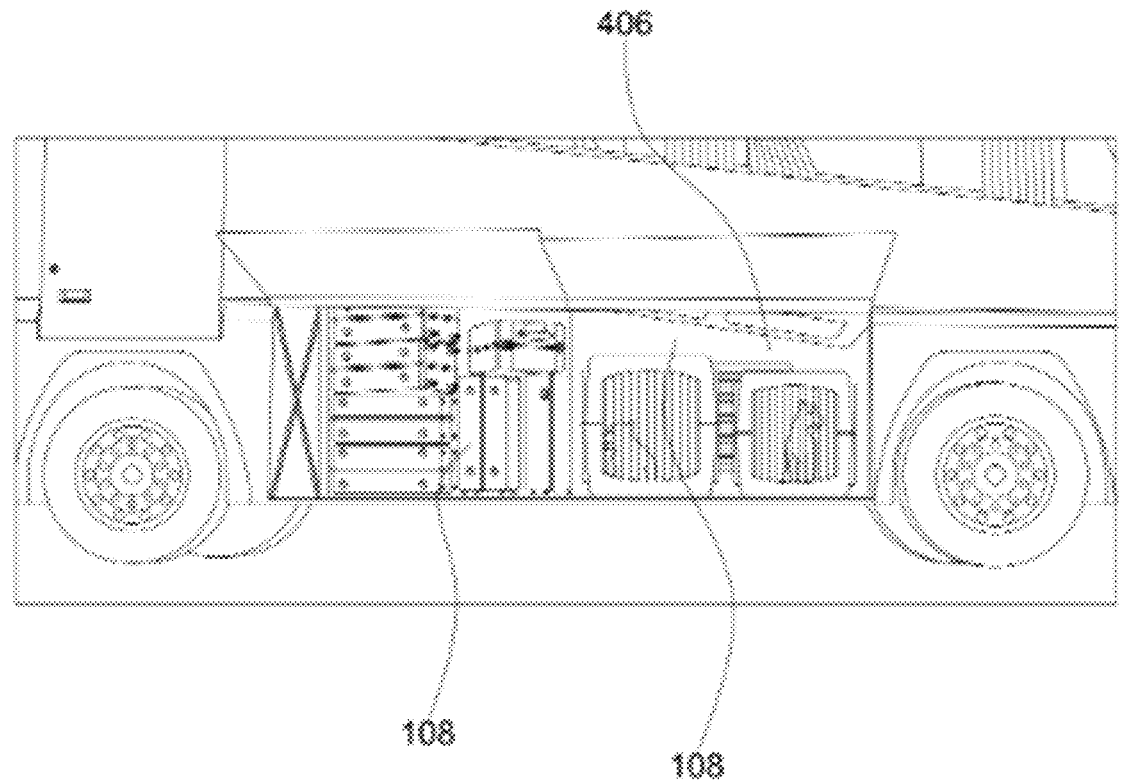
FIG. 4 illustrates an exemplary embodiment of the stowage compartment in accordance with an embodiment of the invention.

The retrofitted stowage space 108 improves user experience by enabling passengers to store their belongings securely and conveniently while monitoring the stowage environment from the comfort of their seats. The retrofitted stowage space 108 is illustrated in FIG. 4 and defined by exemplary space 108. In one embodiment, one or more of the under-compartments created by the progressive floor elevation system 104 may be air-conditioned and/or ventilated 406 and/or equipped with a video camera. The video camera provides a live feed to monitors placed within the bus and/or to a user's computing device, allowing passengers to monitor their belongings during the journey. The retrofitted stowage space is installed by modifying the existing storage areas of the bus and incorporating the necessary electrical and cooling systems in a manner that would be apparent to a person of ordinary skill in the art.

As illustrated in FIGS. 5A and 5B, the engine safety cover 110 is a casing for the bus's engine block that protects the bus and/or passenger from engine malfunction. In one embodiment, it is constructed of steel to resist internal explosions and includes an internal porcelain coating that can retain temperature, preventing external damage in the event of a fire. In one embodiment, the engine safety cover 110 is also comprised of an extinguishing system comprised of temperature sensors and gas tanks 504. The tanks displace oxygen, thereby preventing the spread of fire in emergency situations whenever temperature sensors record a threshold temperature. The engine safety cover 110 is retrofitted onto the existing bus engine compartment, providing enhanced safety features without requiring significant modifications to the bus's powertrain.

To ensure rapid and safe evacuation during emergencies, the invention includes a swing down egress mechanism 112, as illustrated in FIG. 6. This mechanism provides a quick and efficient means of emergency evacuation, allowing passengers to exit the bus safely and rapidly in critical situations. The swing down egress mechanism 112 can be activated both manually and automatically in response to specific emergency conditions, such as a collision or fire. The mechanism is retrofitted onto the existing bus by installing the necessary hardware and control systems, ensuring seamless integration with the bus's existing emergency features.

As illustrated in FIG. 7, the invention may also include a roof mounted air safety system 114. This system improves the air quality within the bus's cabin by removing smoke or other air particulate matter in the event of a fire.

In one embodiment of the present invention, the features described herein are incorporated into the design and manufacturing process of a new bus from the outset, rather than being retrofitted onto an existing vehicle. This approach allows for a more seamless and optimized integration of the progressive floor elevation system, elevated passenger seating assemblies, stowage space, engine safety cover, swing-down egress mechanism, and roof-mounted air safety module. By considering these elements during the initial design phase, engineers can ensure that each component works in harmony with the others, resulting in a more efficient and effective final product.

As illustrated in FIG. 8, a feature of this embodiment is the angled roofline 160, which is designed to complement the progressively elevated seating arrangement. The roofline is constructed to be higher at the rear of the bus and gradually slopes downward towards the front. This design ensures that passengers seated in the rear rows, where the seats are most elevated, have ample headroom. The standard overall height of the bus remains unchanged, but the front portion of the roof may be slightly lower compared to conventional buses. This innovative roofline design provides the necessary vertical space to accommodate the elevated seating without compromising passenger comfort or safety.

Passengers seated in rows 130B, 130C, 130D, 130E, and 130F, among others, benefit from the angled roofline 160. The sloping design begins to rise around the middle of the bus and becomes more pronounced as it reaches the last row of seats. This gradual increase in height aligns perfectly with the progressive elevation of the seating, ensuring that each passenger has sufficient headroom, regardless of their position in the bus.

The angled roofline 160 is constructed using materials typically found in bus manufacturing, such as aluminum or reinforced steel, to maintain structural integrity and durability. Additionally, the design may incorporate extra insulation or padding to enhance passenger comfort by reducing noise and vibration. This attention to detail demonstrates the holistic approach taken in the design of this new bus, focusing not only on the innovative features but also on the overall passenger experience.

Another aspect of this embodiment is the progressively inclined windows 170. Each window is positioned slightly higher than the one immediately in front of it, creating a gradual elevation that starts at the front of the bus and continues towards the rear. This innovative design offers passengers, particularly those in the elevated rear seats, enhanced lateral visibility. By aligning the windows with the elevated seating arrangement, passengers can enjoy a clear side view, regardless of their seat height. This feature eliminates the usual restrictions on side visibility that often accompany elevated seating configurations.

The raised windows 170 work seamlessly with the elevated seating arrangement to provide passengers with an unobstructed view of their surroundings. As each row of seats is elevated compared to the one in front of it, the corresponding window elevation ensures that passengers can maintain a clear line of sight.

Progressive Floor Elevation System 104

Figure 1:
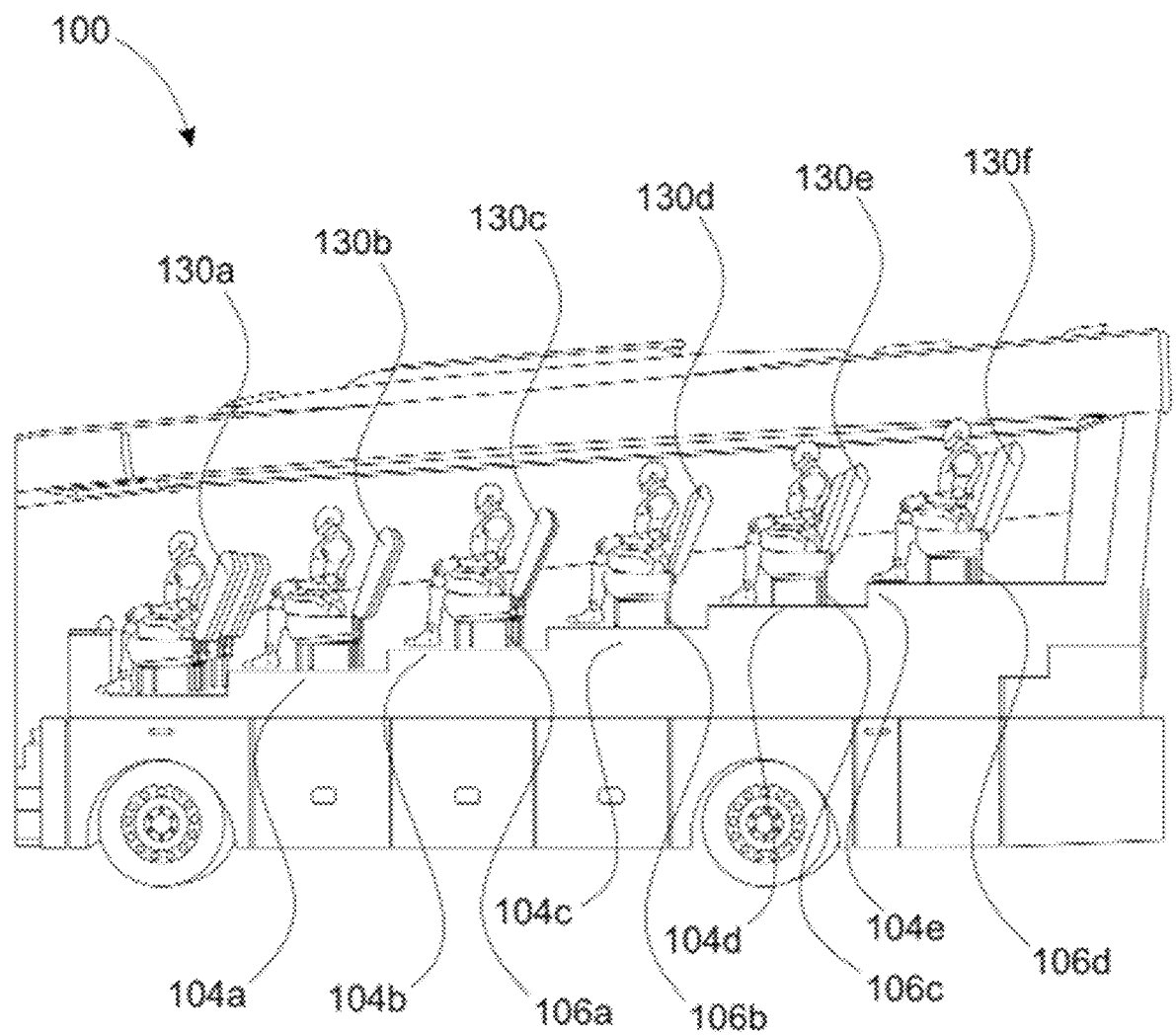
FIG. 1 illustrates a retrofitted bus in accordance with an embodiment of the invention.

FIG. 1 illustrates the progressive floor elevation system 104 comprises a series of modular flooring sections that gradually increase in height from the front of the vehicle to the rear. The progressive floor elevation system 104 improves space utilization within the bus by creating additional storage compartments underneath each elevated section while simultaneously improving visibility for passengers.

In a typical bus layout, the driver's compartment and the front entrance area are located at the lowest level of the bus (except for steps to enter or exit the bus, if available), with the passenger seating and associated flooring being on the same level as the driver's compartment flooring. The progressive floor elevation system 104 begins just behind this area, starting from the second row of seats. The first elevated floor section is installed at this point, raising the floor level slightly above the driver's compartment and front entrance area and each subsequent floor section being raised relative to the section directly in front.

Each floor section is engineered to have a specific height increment, creating a gradual slope from the front of the bus to the rear. This progressive elevation not only improves passenger visibility but also allows for the creation of storage compartments beneath the elevated sections. In an exemplary embodiment, each floor section is raised 10 cm relative to the floor section in front of it (but other distances may be used without departing from the scope of the invention as would be readily understood by a person of ordinary skill in the art). This elevation distance is exemplary only, but an elevation difference is between 5 cm and 80 cm is considered a part of this disclosure.

In one embodiment, the modular floor sections are constructed from lightweight, high-strength materials such as aluminum honeycomb panels or composite sandwich structures. These materials are chosen to minimize the added weight to the bus while providing a stable platform for the seating assemblies 106. The floor sections are designed to be easily installed and secured to the existing bus floor, allowing for a streamlined retrofitting process.

The installation of the progressive floor elevation system 104 involves several steps. First, the existing floor covering, along with any underlying insulation or padding, is removed to expose the bare floor structure of the bus. This step prepares the vehicle for the subsequent installation of the elevated floor sections. Second, depending on the condition and design of the existing floor structure, reinforcement may be required. This reinforcement, aimed at supporting the new elevated floor sections, can involve the addition of cross-members, support beams, or brackets to the existing frame. Third, the modular floor sections are installed, starting from the front of the vehicle and proceeding towards the rear. Each section is securely fastened to the reinforced floor structure using suitable fasteners such as bolts, rivets, or structural adhesives, contingent on the specific design and materials used. Finally, any gaps or seams between the floor sections are sealed to prevent moisture intrusion and to create a smooth, continuous surface. The floor is then finished with a durable, non-slip coating or covering to ensure safe footing for passengers.

Elevated Passenger Seating Assemblies

The elevated passenger seating assemblies 106 attach to the raised floor sections 104 of the bus and/or to the frame of the bus chassis. Each assembly comprises a rigid support structure 110, as illustrated in FIGS. 2A, 2B, and 2C. The rigid support structure 110 can be bolted onto the frame of the bus chassis or on the raised floor section 104. When bolted onto the frame of the bus chassis, this configuration enables a floating structure, which is within the scope of the present invention.

In one embodiment, the bottom portion of the rigid support structure 110 is designed to be securely fastened at the bottom to the frame of the bus. This can be accomplished using bolts or by welding the structure to the bus frame. In another embodiment, the rails 112 that support the rigid support structure 110 may be bolted onto the floors via coupling systems 250A, 250B, 250C, and/or 250D, as illustrated in FIGS. 2A and 2B. Other mechanisms for securing the rigid support structure 110 to the bus, which are known to persons of ordinary skill in the art, may be used without departing from the scope of the invention. The rigid frame structure 110 supports a passenger seat assembly that would be fastened to the top of the rigid frame structure 110. This can be done using bolts or by welding. The rigid frame structure 110 and associated seat assembly are designed to pass crash-worthiness tests when properly attached to the frame of the bus and when passengers are securely fastened using approved seat belts. The height of the rigid frame structure 110 is predetermined to provide an appropriate elevated seat, based on different parameters such as bus model specific dimensions, number of rear seat rows, height of the bus roof, etc. This elevation distance is exemplary only, but an elevation difference is between 5 cm and 80 cm is considered a part of this disclosure. Variations in design, materials, and attachment mechanisms that meet the requirements of the invention and are known to persons of ordinary skill in the art may be used.

FIG. 3 illustrates another component of exemplary embodiments of the invention in which one or more adjustable footrests 115A and/or 115B is provided to passengers to increase comfort and improve ergonomics while being seated in an elevated seat 130 and/or 140. In some embodiments each rigid support structure 110 may comprised of an adjustable footrest(s) 115A and/or 115B, thereby providing each passenger with an adjustable footrest. Only one adjustable footrest(s) 115A and/or 115B is exemplarily shown in FIG. 3, but each rear passenger in each rear row of seats could be provided with their respective foot rest. These adjustable footrests 115, when in their lowermost position, permit each rear row passenger to climb into their elevated seat 130 and/or 140. Once situated in the seat, the passenger can then adjust the height of the footrest 115 to their personal preference. The adjustable foot-rest platform 115 may motor-driven and actuated via a switch mounted beneath the passenger seat assembly.

FIG. 3 illustrates features of an exemplary adjustable footrest platform 115. The adjustable footrest platform 115 is represented in FIGS. 1A and 1B as 115A and/or 115B exemplarily and is also referred to as an adjustable footrest herein. As would be understood by a person of ordinary skill in the art, a footrest 115 may be provided in front of each rear passenger seat of a bus. The adjustable footrest 115 is used to create a more comfortable and ergonomic seating position for a rear passenger seat occupant. As shown in FIG. 3, the adjustable footrest(s) 115A and/or 115B comprises an adjustable platform 410 supported by two scissor support members 420, 422, each scissor support member 420, 422 being pivotally attached at the rear end 424 to floor supports 424. The front end 428 of actuator 426 is attached to the front end 430 of the scissor support members 420, 422, and the rear end 432 of the actuator is configured to brace solidly against the bottom structure of elevated seat (not shown in FIG. 3)

As shown in FIG. 3 the actuator 426 extends and retracts, the front edges of the scissor support members 420, 422 slide along the bottom support brackets 432, 434, to raise and lower the platform 410, as exemplarily shown in actuation steps shown in FIG. 3. In some exemplary embodiments, the actuator 426 is spring-loaded so that the platform 410 lowers when the passenger steps on it and then raises as the passenger's body weight is removed as the passenger sits on the seat. Other mechanisms to raise the platform, which are known to a person of ordinary skill in the art, are hereby incorporated and considered within the scope of the invention.

In other exemplary embodiments, each passenger has their respective footrest 115A and/or 115B and others, and the actuator is controlled by an electric motor drive, and each passenger would have access to their own footrest actuator control switch that could be mounted in any of various possible locations relative to that passenger seat location. A preferred location for the actuator control switch might be directly under the individual passenger seat or on the back of a seat back directly in front of the user, in a location easily accessible by the passenger when seated.

Although the exemplary embodiment includes adjustable footrests 115, it should be clear that other platform configurations are possible. For example, adjustable footrest platforms could be rigidly attached to either the front face of the rigid support member 110 to support the elevated seat or to the rear face of the rigid support member 110 of the elevated row of seats (to provide footrest support to the passengers directly behind the seat that is mounted on the rigid support member 110). In another example, the adjustable footrest platform 115 may be rigidly attached to the back face of chairs/seats that are directly in front of the elevated seats 130 and/or 140.

Retrofitted Stowage Space

The retrofitted bus of the present disclosure is further comprised of a insulation, a climate-control system, and/or a camera or video sensors that transmit a live feed to passengers in the cabin on the retrofitted bus. As illustrated in FIG. 4, the stowage compartment(s) 108 located in the underbody of the bus, wherein the volume of the stowage compartment increases as the flooring directly above the stowage compartment is raised. The enclosed stowage compartment 108 may possess a usable volume of at least 50 liters In one embodiment, each compartment may be fitted with an air conditioning and/or ventilation system 406. One or more video cameras providing a view of the interior space may also be provided. These cameras are connected to a secure live-feed system that transmits real-time video to monitors installed within the passenger cabin of the bus. Alternatively, the live-feed can be accessed through a secure application or website, allowing pet owners to monitor their pets using personal computing devices such as smartphones, tablets, or laptops.

In other embodiments, the stowage compartment system may incorporate a variety of electronic components, including but not limited to temperature sensors, humidity sensors, air quality sensors, cameras, microcontrollers, and communication modules. These components work in tandem to maintain environmental conditions, monitor the well-being of the pets, and transmit live data to passengers and bus personnel. The system's processes and components are designed to be adaptable, ensuring compatibility with a range of bus models and technological advancements.

In addition to climate control and monitoring, the compartments are designed with safety and comfort features for pets. These include non-slip surfaces, soft padding, secure latching mechanisms, and adequate ventilation. The latch may be releasable from inside the passenger cabin. Conventional emergency backup systems may also be used to ensure continuous operation of climate control and monitoring in the event of a power failure.

Alternatively, the retrofitted stowage compartment 108 system for passenger vehicles can be installed in different locations within the bus's existing undercarriage or luggage compartments. The type and size of the compartments can be modified based on the size and type of the bus, as well as the specific requirements of the intended occupants. The monitoring system can use different types of cameras and sensors, and the live-feed system can be configured to provide access through various types of personal computing devices. The safety features can be adapted to suit different types of pets and the climate control system can be adjusted to maintain different temperature ranges. The emergency backup systems can use different types of power sources and the system's processes and components can be designed to be compatible with various bus models and technological advancements.

Engine Cover

As illustrated in FIGS. 5A and 5B, the engine cover 110, in accordance with an embodiment of the inventions, is a casing that is installed around the engine block and/or within the engine compartment of the retrofitted bus (the engine is not visible in FIGS. 5A and 5B). In one embodiment, it is constructed from a composite material that comprises a fire-resistant layer, a thermal insulation layer, and a structural reinforcement layer. The fire-resistant layer is designed from materials that are adept at withstanding high temperatures and preventing fire spread. These materials may encompass elements like fiberglass, ceramic fibers, or other advanced fireproof materials. The thermal insulation layer serves the function of protecting the passenger compartment from heat transfer in the event of a fire in the engine compartment. In one embodiment, the thermal insulation layer constitutes high-temperature insulation foam or aerogel, both of which offer excellent thermal protection properties. The structural reinforcement layer adds durability and impact resistance to the engine cover. In one embodiment, the structural reinforcement layer is composed of materials offering high strength and impact resistance, such as carbon fiber, Kevlar, or similar materials. Integrated within the engine cover are fire suppression systems and thermal sensors for early fire detection and response. This integration allows for rapid fire detection and efficient response, thereby minimizing potential damage and ensuring passenger safety.

In one embodiment, the engine cover may comprise vents 502 that close automatically to prevent the spread of smoke and external damage caused by the fire. In some embodiments, carbon dioxide is concentrated inside the shell to smother the fire and reduce the possibility of an engine explosion. As an alternative embodiment, the engine cover is designed to fit securely over the engine compartment of a bus, featuring contours that complement the bus's design. This embodiment comprises a series of locking mechanisms that allow easy access to the engine for maintenance while ensuring a tight seal during normal operation. The cover also features ventilation ducts that are equipped with fire dampers. These fire dampers are designed to automatically close in the event of a fire, effectively preventing oxygen from fueling the flames. This design complements the fire-resistant and thermal insulation properties of the engine cover, providing a fire safety solution for the engine compartment.

An extinguishing system is also incorporated, which features a temperature sensor that activates gas tanks 504 attached to the engine cover 110. These tanks 504 are strategically placed within the engine compartment and are connected to a network of pipes and nozzles that are designed to rapidly disperse the gas in the event of a fire. The gas used in this system is typically an inert gas, such as carbon dioxide or nitrogen, which effectively displaces oxygen and starves the fire of the necessary fuel to continue burning. The temperature sensor continuously monitors the temperature within the engine compartment and is calibrated to detect abnormal temperature spikes that may indicate the presence of a fire. When the sensor detects a temperature that exceeds a predetermined threshold, it sends a signal to the control unit of the extinguishing system, which in turn activates the gas tanks. Once activated, the gas tanks rapidly release their contents into the engine compartment through the network of pipes and nozzles. The inert gas quickly fills the space, displacing the oxygen and effectively smothering the fire.

Swing Down Egress Mechanism

In one embodiment of the invention, a swing-down egress mechanism is integrated into the rear portion of the bus as illustrated in FIG. 6. This reinforced segment serves dual purposes: a structural component of the vehicle and an evacuation apparatus. The bottom edge of this segment has a hinge, and it is secured in place by a series of fail-safe locking mechanisms. In emergency situations, these locks can be disengaged, allowing the segment to swing downward and outward to form a slide 506 and/or stairs 504. The inner surface of the segment is lined with a high-friction, fire-resistant material to ensure the controlled descent of evacuating passengers.

The swing-down egress mechanism is part of the bus's emergency response system and can be activated in several ways. Manual activation is facilitated through strategically placed handles designed to disengage the locking mechanisms. Additionally, the system can be automatically triggered by sensors that detect certain conditions like rapid deceleration, impact, or rollover. This ensures prompt and reliable availability of the evacuation route in various emergency scenarios.

Retrofitting a swing-down egress mechanism onto an existing bus involves steps to ensure proper functionality and passenger safety. The first step is a structural assessment to ensure the structural integrity of the rear portion of the bus where the swing-down egress mechanism will be installed. Determining if any reinforcements or modifications are necessary to support the additional weight and stress of the evacuation system is crucial.

The next step is reinforcement and preparation. The rear segment of the bus is reinforced as necessary, using high-strength materials such as steel or composite panels. Additional support beams, cross-members, and mounting points may be added to create a sturdy foundation for the swing-down mechanism. Any existing components or trim that may interfere with the installation are removed.

Following this, heavy-duty, load-bearing hinges are installed along the bottom edge of the reinforced rear segment. These hinges should be designed to withstand the weight of the segment and the forces exerted during the swinging motion. They are securely fastened to both the rear segment and the bus's main structure.

Fail-safe locking mechanisms are attached to the sides and top of the rear segment. These locks hold the segment securely in place during normal operation but allow for quick and reliable disengagement in an emergency. High-strength, corrosion-resistant materials are considered for the locking components.

The inner surface of the rear segment is lined with a high-friction, fire-resistant material to provide a safe and controlled descent for evacuating passengers. Manual activation handles are installed at strategic locations near the swing-down egress mechanism. These handles are clearly marked, easily accessible, and designed to disengage the locking mechanisms with minimal effort.

The swing-down egress mechanism 112 is integrated with the bus's emergency response system. Sensors that can detect specific conditions such as rapid deceleration, impact, or rollover are installed. These sensors are connected to a control module that can automatically trigger the release of the locking mechanisms when needed. The necessary wiring and electrical connections for the automatic activation system are routed, ensuring that they are properly insulated and protected from damage.

Different materials could be used for the reinforced segment, lining, and locking mechanisms, provided they meet the necessary strength and safety standards. The mechanisms for activating the egress system could also vary, such as using levers, buttons, or voice-activated systems instead of handles. The detection system could be designed to respond to different triggers, such as smoke or heat, in addition to deceleration, impact, and rollover. The shape and size of the egress mechanism could also be modified to fit different types of vehicles and to accommodate specific evacuation requirements.

Roof Mounted Air Safety System

The roof mounted air safety system 114 improves cabin air quality in case of fire or other emergency situations that may compromise air quality within the bus. In one embodiment, the roof mounted air safety system 114 is comprised on one or more fans 702, air ducts, and air filters. In one embodiment, this system is installed on the roof.

In one embodiment, the roof mounted air safety system 114 rapidly removes smoke, toxic fumes, and other airborne particulate matter from the bus's cabin. The system is activated automatically by smoke detectors and temperature sensors placed throughout the vehicle, or it can be manually triggered by the driver or other safety personnel.

When activated, the exhaust fans create a suction force that pulls contaminated air from the cabin into the air ducts. As the air passes through the HEPA filters, particulate matter, including smoke particles and other pollutants, is effectively trapped and removed from the airstream. The filtered air is then expelled outside the vehicle through vents located on the roof of the bus. In alternative embodiments, the system may work in reverse, pulling in fresh air from the outside environment into the bus's passenger cabin.

The air ducts are designed to provide comprehensive coverage of the bus's interior, with intake vents positioned at strategic points to ensure efficient extraction of contaminated air. These ducts are constructed from heat-resistant and flame-retardant materials, such as aluminum or steel, to maintain structural integrity and performance even in the presence of high temperatures.

The HEPA filters used in the system are capable of capturing particles as small as 0.3 microns with an efficiency of 99.97%. These filters are regularly maintained and replaced to ensure optimal performance and effectiveness in removing airborne contaminants.

In one embodiment, the exhaust fans are high-performance, industrial-grade units that are designed to move large volumes of air quickly and efficiently. They are powered by the bus's electrical system and are equipped with backup batteries to ensure continued operation even in the event of a power failure.

Additional Elements/Embodiments

In one embodiment of the invention, the inventive features are part of a new bus (as opposed to a retrofitted pre-existing bus). The features described herein, such as the progressive floor elevation system, elevated passenger seating assemblies, stowage space, engine safety cover, swing down egress mechanism, and roof mounted air safety module are integrated into the vehicle's design from the outset. This allows for a more seamless and optimized implementation of these features, as they can be incorporated during the manufacturing process rather than being retrofitted onto an existing structure as would be apparent to a person of ordinary skill in the art.

The embodiment where a new bus is manufactured may incorporate angled roofing 160 and a progressively raised window layout as illustrated in FIGS. 8A and 8B.

In one embodiment, the roofline 160 is designed to be higher at the back of the bus and gradually lowers towards the front. This design aligns with the progressively elevated seating arrangement, ensuring that passengers seated in the rear rows have ample headroom. In this embodiment, the standard height of the bus remains unchanged, but the front roof may be lower compared to conventional buses. In one embodiment, the roofline at the front of the bus is 4 meters from the ground and the roofline at the back of the bus is 4.15 meters from the ground.

This feature benefits passengers in rows labeled 130B, 130C, 130D, 130E, and 130F, among others. The sloping design of the roofline starts to rise, generally, around the middle of the bus, becoming more pronounced as it reaches the last row of seats.

The angled roofline 160 complements the elevated seating arrangement by providing the additional vertical space that would otherwise be compromised due to the elevation of the seats. This allows for the dual benefit of improved visibility and increased headroom, making the ride more comfortable for passengers in the back.

Roofline 160 can be constructed from the same materials typically used in bus construction, such as aluminum or reinforced steel, to ensure structural integrity. The design could also incorporate additional insulation or padding to enhance passenger comfort.

An alternative to the angled roofline 160 may incorporate adjustable roof panels that can be manually or automatically raised or lowered. This would allow for variable headroom As illustrated in FIG. 6, the raised windows of the bus 100 may be progressively inclined, wherein each window is slightly higher than the window immediately in front of it. This progressive elevation starts from the front of the bus and continues toward the rear. This design offers passengers, especially those in elevated seats towards the back, high lateral or side visibility.

In one embodiment, the raised windows 170 work in conjunction with the previously described elevated seating arrangement. Since each row of seats is elevated compared to the row in front of it, raising the height of each subsequent window allows passengers to maintain a clear side view regardless of the height of their seats. This design removes the usual restrictions on side visibility that would come with elevated seating. The raised windows 170 can be made from standard window materials used in bus construction, such as tempered or laminated glass, ensuring safety and durability. The window frames may be made from materials like aluminum or reinforced steel, consistent with standard bus construction methods.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A retrofitted vehicle comprising:
a passenger-vehicle body originally manufactured with:
a floor pan,
a front-row seat assembly fixed to the floor pan, and
factory rear-seat anchor points located behind the front-row seat assembly;
a rigid support structure fastened directly to the factory rear-seat anchor points, the rigid support structure having a height in a range of 10 cm to 60 cm;
a passenger seat assembly secured to an upper surface of the rigid support structure such that the passenger seat assembly is elevated relative to the front-row seat assembly thereby affording the elevated occupant a forward sightline through a windshield of the vehicle above a headrest of the front-row seat assembly;
walls extending between the rigid support structure and the floor pan that together bound an enclosed stowage compartment located entirely beneath the passenger seat assembly;
at least one closable access door mounted in a vertical face of the rigid support structure and movable between a closed position sealing the stowage compartment and an open position that provides user access to the stowage compartment from the passenger cabin or a cargo-area opening of the vehicle; and
an adjustable foot-rest platform disposed forward of the passenger seat assembly and coupled to the rigid support structure by a movable scissor or link mechanism, the foot-rest platform being selectively positionable by the occupant between a lowered boarding position and a plurality of raised ergonomic support positions.

2. The retrofitted vehicle of claim 1, wherein the enclosed stowage compartment possesses a usable volume of at least 50 liters.

3. The retrofitted vehicle of claim 1, wherein the access door is hinged along a lower edge and includes a latch releasable from inside the passenger cabin.

4. The retrofitted vehicle of claim 1, wherein the adjustable foot-rest platform is biased downward by occupant weight and returns upward under spring force when the weight is removed.

5. The retrofitted vehicle of claim 1, wherein the adjustable foot-rest platform is motor-driven and actuated via a switch mounted beneath the passenger seat assembly.

6. The retrofitted vehicle of claim 1, further comprising a pair of longitudinal rails secured to the floor pan, the rigid support structure being mounted on the rails for selective fore-and-aft sliding translation relative to the floor pan.

7. The retrofitted vehicle of claim 1, wherein the rigid support structure spans substantially an entire width of the vehicle interior between opposed door sills.

8. The retrofitted vehicle of claim 1, wherein the vehicle further comprises a second rigid support structure and a second passenger seat assembly positioned rearward of the passenger seat assembly, the second rigid support structure having a greater height than the rigid support structure such that occupants of both passenger seat assemblies are able to view forward over the front-row seat assembly.

* * * * *